United States Patent
Shih (10) Patent No.: US 11,131,589 B2
(45) Date of Patent: Sep. 28, 2021

(54) PIEZOELECTRIC THIN-FILM SENSOR AND USE THEREOF

(71) Applicant: TEXAS INSTRUMENTS INCORPORATED, Dallas, TX (US)

(72) Inventor: Wei-Yan Shih, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 626 days.

(21) Appl. No.: 15/947,429

(22) Filed: Apr. 6, 2018

(65) Prior Publication Data

US 2018/0231423 A1 Aug. 16, 2018

Related U.S. Application Data

(62) Division of application No. 14/618,175, filed on Feb. 10, 2015, now Pat. No. 9,970,831.

(60) Provisional application No. 61/937,890, filed on Feb. 10, 2014.

(51) Int. Cl.
*G01L 1/16* (2006.01)
*G01P 15/09* (2006.01)
*G01P 15/12* (2006.01)

(52) U.S. Cl.
CPC ............. *G01L 1/16* (2013.01); *G01P 15/09* (2013.01); *G01P 15/123* (2013.01)

(58) Field of Classification Search
CPC ......... G01L 11/16; G01P 15/09; G01P 15/123
See application file for complete search history.

(56) References Cited

U.S. PATENT DOCUMENTS

| 4,972,713 | A | 11/1990 | Iwata |
| 8,803,405 | B2 | 8/2014 | Nakamura et al. |
| 9,003,887 | B2 | 4/2015 | Matsumoto |
| 9,170,270 | B2 | 10/2015 | Han et al. |
| 9,702,698 | B2 | 7/2017 | Naono et al. |
| 2004/0027033 | A1 | 2/2004 | Schiller |
| 2007/0035207 | A1 | 2/2007 | Kawamura et al. |
| 2007/0194662 | A1 | 8/2007 | Sano et al. |
| 2007/0226974 | A1 | 10/2007 | Li |
| 2010/0072860 | A1 | 3/2010 | Kim et al. |
| 2012/0043855 | A1 | 2/2012 | Kang et al. |
| 2013/0169113 | A1 | 7/2013 | Lim et al. |
| 2013/0307375 | A1 | 11/2013 | Udayakumar et al. |
| 2013/0328446 | A1 | 12/2013 | Horiguchi et al. |
| 2015/0177197 | A1* | 6/2015 | Kojima ............... G01L 9/08 73/627 |

* cited by examiner

*Primary Examiner* — J. San Martin
(74) *Attorney, Agent, or Firm* — Michael A. Davis, Jr.; Charles A. Brill; Frank D. Cimino (57) ABSTRACT

A piezoelectric sensor comprises a support structure, a channel extending through the support structure, a sensing material stack coupled to the support structure and extending over the channel, and a filler material disposed within the channel and over the sensing material stack. The sensing material stack comprises an structural layer, a first electrode layer disposed on the structural layer, a piezoelectric material disposed in a piezoelectric layer on the first electrode, and a second electrode disposed on the piezoelectric layer opposite the first electrode layer.

6 Claims, 6 Drawing Sheets

PIEZOELECTRIC THIN-FILM SENSOR AND USE THEREOF

CROSS-REFERENCE TO RELATED APPLICATIONS

This application is a divisional of U.S. patent application Ser. No. 14/618,175 filed Feb. 10, 2015, which claims priority to U.S. Provisional Patent Application Ser. No. 61/937,890 filed Feb. 10, 2014, the entireties of both of which are incorporated herein by reference.

BACKGROUND

Some sensors such as pressure or impact sensors contain piezoelectric elements. These elements are generally based on bulk-processed, sintered ceramics or crystals. The high level of defectivity within these fragile crystalline structures results in failure at relatively low strain levels. For example, some piezoelectric elements begin to fail at a strain of around 0.1%. The brittleness of such ceramics also limits miniaturization & thinning with conventional manufacturing techniques such as machining, grinding, and cutting. The resulting sensors containing these elements are limited in application due to the limits on the piezoelectric elements themselves. In order to address these limits, the piezoelectric sensors have been placed in protective housings or canisters and are connected to specific proof masses designed to avoid damaging the piezoelectric elements in use. However, the housing tends to limit the usefulness of the sensors both in terms of the physical space required by the housing as well as the dynamic limits that can be achieved through the use of the housing and the proof mass. As a result, these types of sensors cannot be used in all situations.

SUMMARY

In an embodiment, a piezoelectric sensor comprises a support structure, a channel extending through the support structure, a sensing material stack coupled to the support structure and extending over the channel, and a filler material disposed within the channel and over the sensing material stack. The sensing material stack comprises an structural layer, a first electrode layer disposed on the structural layer, a piezoelectric material disposed in a piezoelectric layer on the first electrode, and a second electrode disposed on the piezoelectric layer opposite the first electrode layer. The sensing material stack can also include a piezoresistive layer, and the piezoresistive layer can be coupled to a Wheatstone bridge circuit. The support structure has a bulk modulus, and the filler material has a bulk modulus. A ratio of the bulk modulus of the support structure to the bulk modulus of the filler material can be between about 10 and about 1,000,000. The filler material can comprise a shear thickening material. A thickness of the sensing material stack can be about 5 microns or less. A thickness of the support structure can be between about 0.01 millimeter to about 1.0 millimeter. The piezoelectric material can comprise lead zirconate titanate, lead magnesium niobate-lead zirconate titanate, lead zirconate niobate-lead zirconate titanate, aluminum nitride, zinc oxide, quartz, tourmaline, ternary alloys such as scandium doped aluminum nitride, or any combination thereof. The filler material can comprise silicone rubber, natural rubber, a polymer, polyurethane, epoxies, adhesive resins, or any combination thereof. The piezoelectric material can comprise a highly oriented crystal structure.

In an embodiment, a system comprises a sensor comprising a sensing material stack, a filler material disposed on a first side and a second side of the sensing material stack, and a substrate. The sensing material stack comprises a piezoelectric layer, a first electrode disposed on a first side of the piezoelectric layer, and a second electrode disposed on a second side of the piezoelectric layer. The sensor is coupled to the substrate. The system can also include a proof mass. The sensor can be coupled to the substrate through the first side of the filler material, and the proof mass can be coupled to the sensor through the second side of the filler material. The system can also include a coupling agent that couples the sensor to the substrate. The sensor can also include a support structure, and the sensing material stack can be supported on at least one end by the support structure. The sensing material stack can also include a piezoresistive layer. The piezoelectric material can comprise lead zirconate titanate, lead magnesium niobate-lead zirconate titanate, lead zirconate niobate-lead zirconate titanate, aluminum nitride, zinc oxide, quartz, tourmaline, ternary alloys such as scandium doped aluminum nitride, or any combination thereof. The filler material can comprise silicone rubber, natural rubber, a polymer, polyurethane, epoxies, adhesive resins, or any combination thereof.

In an embodiment, a method of detecting a signal with a piezoelectric sensor comprises receiving a mechanical force at a piezoelectric sensor, transmitting the force to a sensing material stack through a filler material, deflecting the sensing material stack in response to transmitting the force, and generating an electrical signal in response to deflecting the piezoelectric material in the sensing material stack. The filler material is disposed on both sides of the sensing material stack, and the sensing material stack comprises a layer of piezoelectric material. The piezoelectric sensor can comprise a support structure comprising a channel, and the sensing material stack can extend and deflect over the channel. The piezoelectric sensor can be coupled to a substrate, and receiving the mechanical force can comprise passing the mechanical force through the substrate, into the filler material, and to the sensing material stack. The piezoelectric sensor may also include a proof mass coupled to the filler material, and receiving the mechanical force can comprise moving the proof mass to generate the mechanical force, transmitting the mechanical force from the proof mass, into the filler material, and to the sensing material stack. The piezoelectric sensor can be coupled to a substrate. The method can also include contacting the piezoelectric sensor with an external surface, where the filler material contacts the external surface, and generating the mechanical force in response to contacting the piezoelectric sensor with the external surface. Transmitting the force to the sensing material stack can comprise transmitting the mechanical force into the filler material and to the sensing material stack. The sensing material stack can also include a piezoresistive element. The method can also include changing a resistance of the piezoresistive element in response to deflecting the sensing material stack, detecting the resistance change of the piezoresistive element using an external circuit after changing the resistance, and determining a strain applied to the piezoelectric sensor based on the resistance change. Measuring the resistance change can comprise applying at least one of a voltage or current across the piezoresistive element, and the at least one of the voltage or current may only be applied across the piezoresistive element after generating the electrical signal in response to deflecting the piezoelectric material.

DETAILED DESCRIPTION OF EXAMPLE EMBODIMENTS

In general, a piezoelectric sensor uses a material that produces a voltage or an electric charge when the material is mechanically deformed, deflected, or otherwise subjected to a mechanical stress or pressure. As used herein, deflecting refers to a substantially non-destructive deformation or movement of the sensor elements. Piezoelectric materials include piezoelectric ceramics and crystal materials. Piezoelectric sensors can be considered active sensors since no external electrical source of power is required to generate an electrical output from the piezoelectric material. Due to a charge leakoff in a sensor, piezoelectric sensors are not generally used for static measurements such as a steady deflection or pressure, and rather are used to generally detect an event, such as movement, shock, impact, or a mechanical vibration or wave as it occurs.

Disclosed herein are piezoelectric sensors that incorporate a thin film of piezoelectric material. The use of a thin film allows for a greater strain (e.g., on the order of up to about 1%) prior to encountering adverse effects (e.g., failure, breaking, and the like) than bulk ceramics used in some piezoelectric sensors that begin to fail on the order of 0.1% strain. The ability to withstand higher strains may enhance the sensor's sensitivity and dynamic range. The thin film can be encapsulated, enclosed, or covered with a relatively flexible polymeric filler material. The filler material may serve to transmit a mechanical force to the piezoelectric film while protecting the piezoelectric material from large forces that could damage the film. For example, when the filler material is disposed between the piezoelectric sensor element and a surface, an external load can be transferred to the surface through the filler material without damaging the film. At the same time, the relative flexibility of the filler material provides adequate movement of the piezoelectric layer to produce an electrical signal.

The use of a thin film in the sensor design may also allow for a relatively small sensor that can be used in a variety of applications. The small size may reduce the amount of material, and therefore the cost, of the sensor modules. The small size and weight of the piezoelectric sensor layer may also provide for a faster measurement speed due to the low inertia of the sensor elements. The sensor can be used to measure a mechanical signal or stimuli traveling on or through a device to which it is connected. A proof mass can be connected to the sensor in some cases. In some instances, the sensor can be used as a contact sensor to provide an indication of a contact or impact. Such embodiments may be useful in the field of robotics to provide a touch sensor for more natural handling of sensitive objects.

A piezoresistive layer can also be used with the sensor to provide a strain measurement produced by static forces. As used herein, reference to "piezoresistive material" includes both semiconductors as well as common metallic strain gauge materials. Both types of materials exhibit predictable resistance change upon straining. The semiconductor type generally exhibits higher resistance sensitivity to strain and temperature, while the metallic type is less sensitive to both strain and temperature changes. The use of the piezoresistive layer may provide for a sensor capable of measuring both dynamic and static forces.

Figure 1:
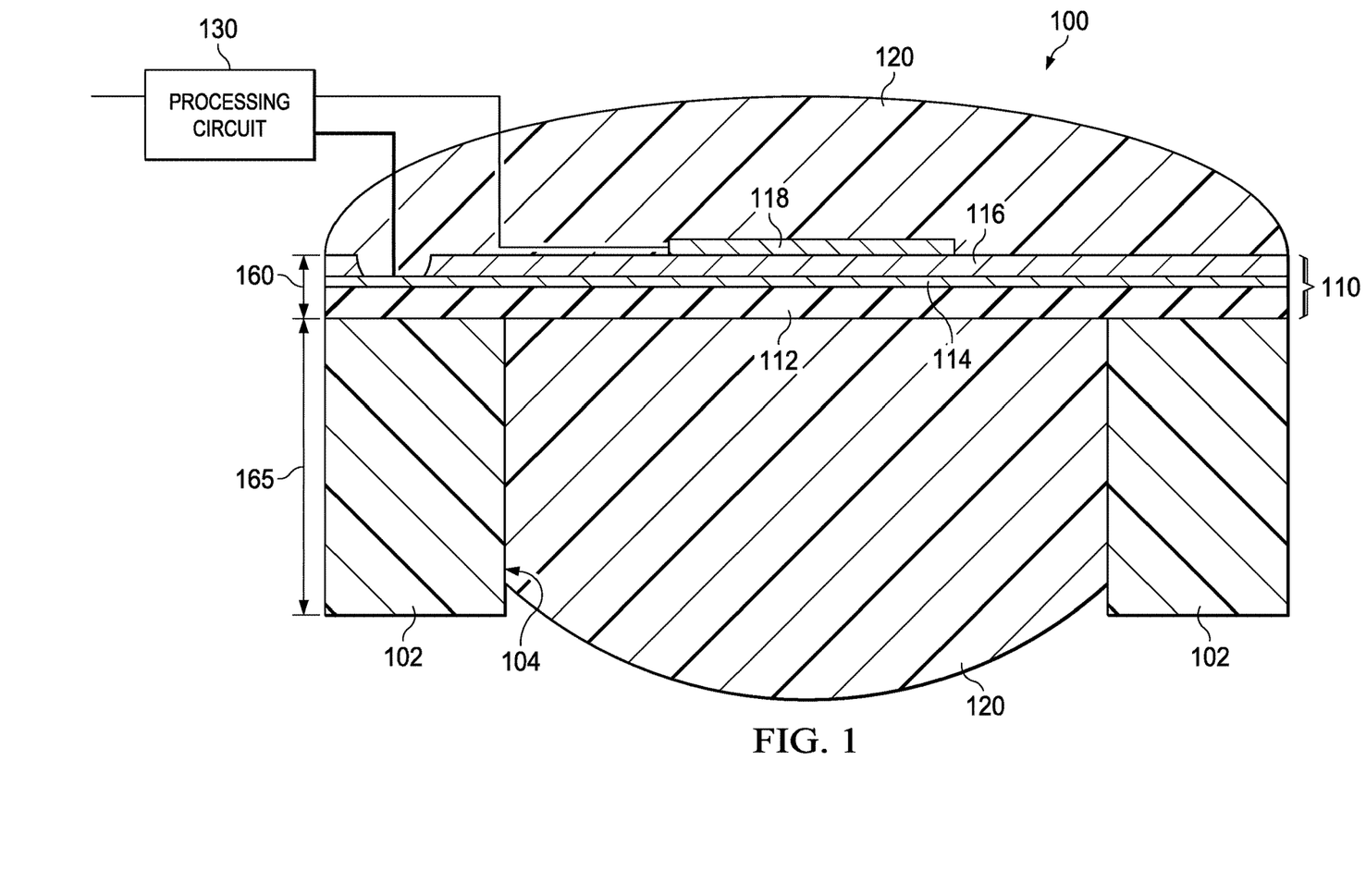
FIG. 1 illustrates a schematic cross-section of a sensor according to an embodiment.

A schematic cross-sectional view of an embodiment of a piezoelectric sensor 100 is illustrated in FIG. 1. The sensor 100 generally comprises a support structure 102 supporting a sensing material stack 110 having a structural layer 112, a first electrode layer 114, a piezoelectric material layer 116, a second electrode layer 118. A filler material 120 can be disposed on one or more sides of the sensing material stack 110. It can be appreciated that the sensor serves to generate an electrical signal (e.g., a voltage and/or current) in response to being deflected or otherwise mechanically moved from a resting state by one or more mechanical stimulus. The resulting electrical signal can be detected with a processing circuit 130 or other circuit in electrical contact with the first electrode layer 114 and the second electrode layer 118. The processing circuit can include a comparator, amplifier, and/or any other suitable processing components for analyzing the electrical signal.

As seen in FIG. 1, the sensing material stack 110 extends across and is supported by the support structure 102. In order to allow the sensing material stack to flex in response to a signal, a channel 104 may be formed through the support structure 102. The channel 104 can extend entirely through the support structure 102 or form a cavity within the support structure 102. The channel 104 can have any shape that allows the sensing material stack 110 to be exposed on both sides. For example, the channel can be round, oblong, rectilinear, or the like. While shown as extending across a single channel 104, the sensing material stack 110 can extend across a plurality of channels 104 and/or be cantilevered from one or more support structures to extend across one or more channels 104.

The support structure 102 serves to form a relatively fixed base for the sensing material stack 110. The movement or flexure of the sensing material stack 110 relative to the support structure 102 allows for the generation of the electrical signal. The support structure 102 can be formed of any material capable of supporting the sensing material stack 110. In an embodiment, the support structure can be formed from a semiconductor material, glass, ceramics, a polymeric material, a metal, or the like. As described in more detail herein, the sensor 100 can be produced using integrated circuit manufacturing techniques. In this embodiment, the support structure 102 can comprise any material that can be etched, machined, or otherwise removed to produce the channel 104. For example, the support structure can comprise a semiconductor material such as silicon, germanium, gallium arsenide, SiGe, GaN, SiC, sapphire, silicon on insulator (SOI), or any combination thereof.

The sensing material stack 110 can comprise a number of layers configured to support the piezoelectric material layer 116, support the sensing material stack 110 across the channel 104, and transmit a generated electrical signal to an external detector. The structural layer 112 serves to support the electrode layers 114, 118 and the piezoelectric material layer 116 across the channel 104 while allowing the sensing material stack 110 to flex in response to an applied force or mechanical stimulus. The stiffness of the structural layer 112 can be selected to provide the desired degree of flexure of the overall sensing material stack 110 based on the dimensions of the channel, the dimensions of the sensing material stack 110, the type of filler material 120 used, and the like. In some embodiments, the structural layer 112 may serve to provide an electrical insulating layer between the electrode layer and the other layers such as the structural support 102, the filler material 120, and/or a device in contact with the sensor 100. In an embodiment, the structural layer 112 may comprise a polymeric material, a dielectric material, or the like. In some embodiments, the structural layer 112 comprises a polyimide, a fluoropolymer, a polynorbornene, silicon dioxide, phosphor and/or boron doped silicon dioxide, fluorine and/or carbon doped silicon dioxide, a silicon nitride, a silicon oxynitride, or the like.

The piezoelectric material layer 116 can comprise any material that generates an electrical charge in response to an applied mechanical force. In an embodiment, the piezoelectric material is provided as a thin film such as those used in integrated circuit manufacturing. The thickness of the piezoelectric layer 116 may be between about 0.1 microns and about 2 microns, or between about 0.2 microns and about 1 micron. The piezoelectric material forming the piezoelectric layer can be polycrystalline, single crystal, or any combination thereof. In an embodiment, the piezoelectric material may include, but is not limited to, lead zirconate titanate, lead magnesium niobate-lead zirconate titanate, lead zirconate niobate-lead zirconate titanate, aluminum nitride, zinc oxide, quartz, tourmaline, ternary alloys such as scandium doped aluminum nitride, or any combination thereof. When the piezoelectric material comprises a polycrystalline material, the crystals may have a highly oriented crystal structure. This may enhance the piezoelectric effect obtained from the piezoelectric layer upon being deflected.

The first electrode layer 114 and the second electrode layer 118 serve to conduct or transmit an electrical signal generated across the piezoelectric material in the piezoelectric layer 116 in response to a mechanical deflection to an external detector. The electrode layers 114, 118 can be formed from any electrically conductive materials using various techniques on each side of the piezoelectric material layer 116. One or both of the electrode layers 114, 118 can be formed from one or more layers of metal such as gold, silver, molybdenum, platinum, palladium, iridium, copper, aluminum, titanium, and/or any alloy thereof. In some embodiments, one or more of the electrode layers can be formed from a silicon based material such as silicon and/or silicon nitride that may or may not be doped or coated with a thin layer of metal. Electrical conductors can be electrically coupled to the electrode layers 114, 118 to provide electrical communication between the electrode layers 114, 118 and a processing circuit 130 or other external circuitry (e.g., a processor, etc.) to detect the electrical signal. The processing circuit 130 can comprise any device suitable for measuring the electrical signal and/or converting the voltage or current into a signal used by another device.

The filler material 120 can be disposed about the sensing material stack 110 one or more sides. In general, the filler material 120 serves to protect the components of the sensing material stack from the environment as well as providing a force transfer medium for the sensing material stack 110. One or more filler materials can be disposed and/or bonded to both surfaces of the sensing material stack 110. The filler material 120 can substantially fill the cavity 104 to exclude pockets of gas or air. The filler material 120 can be the same on each side of the sensing material stack 110 or the filler material can be different.

In general, the filler material 120 is configured to be flexible enough to allow the sensing material stack 110 to flex in response to an applied force while also serving as a load transfer medium for high load conditions. In order to allow the sensing material stack to flex, the filler material may comprise a compliant material such as an elastomeric material (e.g., silicone rubber, natural rubber, a polymer, and the like). In some embodiments, electronic potting materials such as polyurethane, epoxies, adhesive resins, silicone rubber, and the like can be used as the filler material. The filler material may also be impermeable to liquids such as water.

In order to provide the desired flexure of the sensing material stack 110, the filler material may be relatively compliant as compared to the support structure 102. In an embodiment, the filler material may have a bulk modulus of between about $1 \times 10^5$ to about $1 \times 10^{10}$ Pascal (Pa). The structural material may have a bulk modulus of between about $1 \times 10^9$ to about $1 \times 10^{12}$ Pa. In some embodiments, a ratio of the bulk modulus of the support structure to the bulk modulus of the filler material may greater than about 10, greater than about 100, greater than about 500, or greater than about 1,000. In some embodiments, the ratio of the bulk modulus of the support structure to the bulk modulus of the filler material may be less than about 2,000, less than about 10,000, less than about 100,000, or less than about 1,000,000.

When a force is applied to the filler material 120, the filler material deforms, which results in the deflection of the sensing material stack 110. As the force increases, the strain rate dependence of the filler material may allow the force to pass to the surface upon which the sensor 100 is mounted. This may prevent excessive deflection of the sensing material stack 110 that can damage the piezoelectric layer. In some embodiments, load redistribution can be achieved through the use of a shear thickening filler material 120. As the force on the filler 120 material increases, the filler material 120 may thicken to effectively reduce the amount of incremental deflection. The filler material serves to limit the amount of deflection of the sensing material stack 110 as it is confined within the channel cavity 104. Through the selection of the material used for the filler material 120 along with the expected load, the load handling for the sensor 100 can be controlled.

In an embodiment, the sensor 100 can be formed using integrated circuit techniques to form a micro-device. For example, the thickness 160 of the sensing material stack 110 (e.g., the dimension in a direction orthogonal to the plane of the sensing material stack 110) may be less than about 15 microns, less than about 10 microns, or less than about 5 microns. The thickness of the sensing material stack 110 may be greater than about 0.1 microns, greater than about 0.5 microns, or greater than about 1 micron. The structural layer 112 may have a thickness between about 0.5 micron and about 7 microns, or between about 2 microns and about 5 microns. The first electrode 114 and/or the second electrode 118 may have a thickness between about 0.01 microns and about 0.5 microns. The thickness of the piezoelectric layer 116 may be between about 0.05 microns and about 2 microns, or between about 0.2 microns and about 1 micron. The thickness 165 of the support structure 102 and/or the channel 104 may be between about 0.01 millimeters (mm)

and about 1 mm, or between about 0.1 mm and about 0.5 mm. The overall length or diameter of the sensor 100 (e.g., in a direction parallel to the main plane of the sensing material stack 110) may be between about 0.1 mm and about 10 mm, or between about 0.2 mm and about 5 mm.

Figure 2:
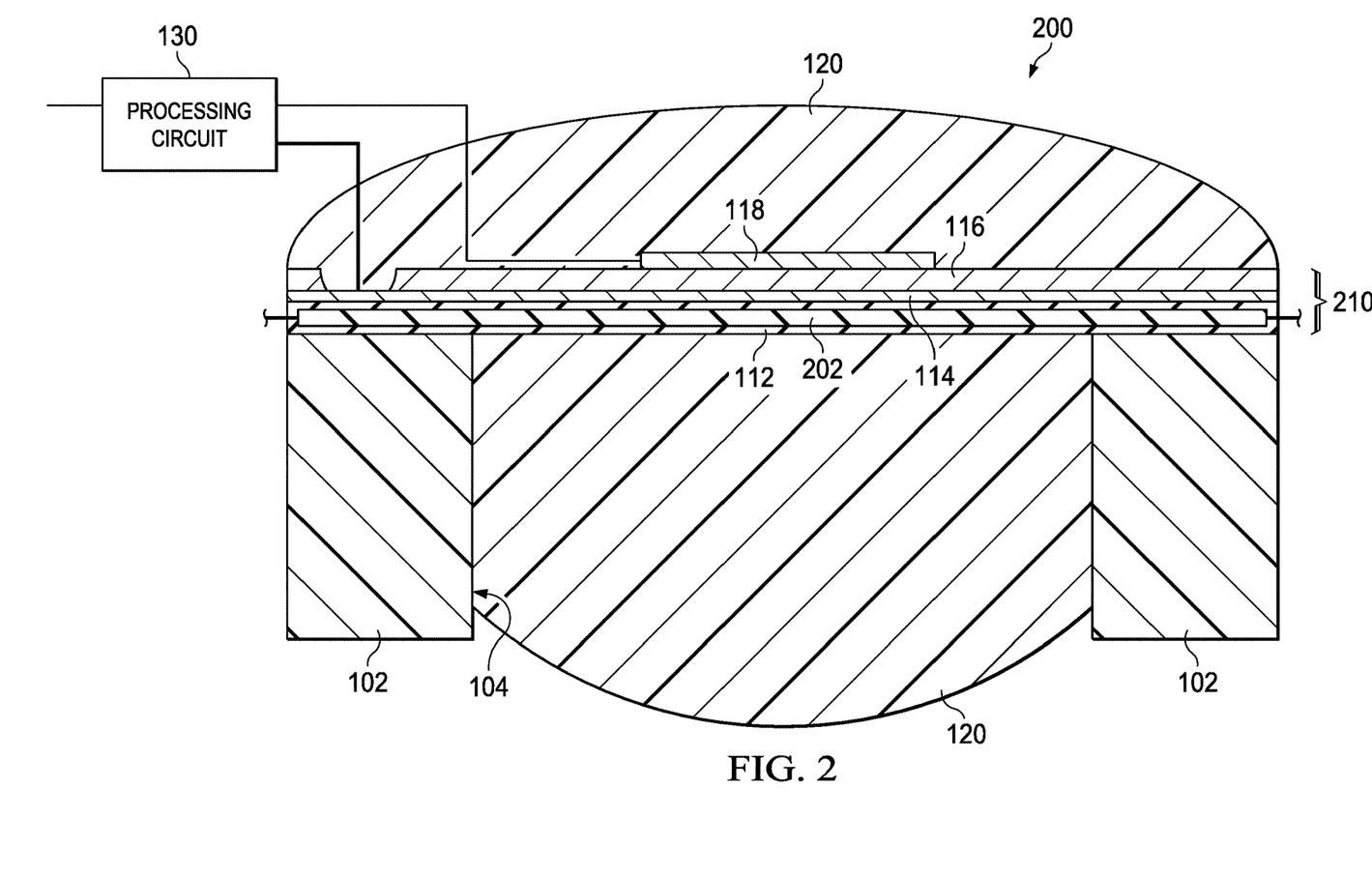
FIG. 2 illustrates another schematic cross-section of a sensor according to an embodiment.

Another schematic cross-sectional view of an embodiment of a piezoelectric sensor 200 is illustrated in FIG. 2. The piezoelectric sensor 200 is similar to the piezoelectric sensor 100 described with respect to FIG. 1, and similar components are not described in the interest of brevity. The main difference between the piezoelectric sensor 200 illustrated in FIG. 2 and the sensor 100 described with respect to FIG. 1 is the presence of a piezoresistive element 202. In general, the piezoelectric layer 116 may be used to generate an electrical signal in response to a mechanical deflection. Due to electrical leak-off, the piezoelectric layer may not provide a reliable signal for static loads. The addition of the piezoresistive element 202 may allow for static loads to be measured along with the dynamic loads measured by the piezoelectric layer 116. This can provide a robust sensor capable of detecting a range of pressure and impact forces, both dynamic and static. As described in more detail herein, the piezoresistive element may be used to sense the strain on the sensor 200 once an impact is detected by the piezoelectric layer 116.

As illustrated in FIG. 2, the piezoresistive element 202 may comprise a piezoresistive material that experiences a change in electrical resistivity in response to a mechanical strain. By arranging the piezoresistive material in a circuit having an applied voltage or current, the change in the resistance can be detected and correlated with the mechanical strain. In some embodiments, the piezoresistive element 202 may comprise a simple circuit having two leads with an applied current and/or voltage configured to measure a resistance and/or change in resistance across the piezoresistive element. The leads electrically coupled to the piezoresistive element 202 may be coupled to a circuit or one of the leads can be coupled to ground. In some embodiments, a Wheatstone bridge configuration can be used for the piezoresistive element 202.

In an embodiment, the piezoresistive element 202 comprises a piezoresistive material layer having a piezoresistive material. Any material having piezoresistive properties can be used in the piezoresistive element. Piezoresistive materials can include, but are not limited to, semiconductor materials such as silicon (e.g., polycrystalline silicon, amorphous silicon, single crystal silicon, and the like), silicon with boron, silicon with arsenic, silicon carbide, germanium, and the like. In some embodiments, the piezoresistive element can comprise a metal based strain guage material such as CrCu, NiCr, SiCr, CuNi, and any alloys thereof, with and without tertiary components. In addition to the piezoresistive material layer, the piezoresistive element 202 may comprise one or more contacts and/or leads to provide the circuit for the piezoresistive element 202. An external power source and detector can be used to provide the voltage and/or current to the piezoresistive element and determine the load on the sensor 200.

In an embodiment, the piezoresistive element 202 may form a portion of the sensing material stack 210. As shown in FIG. 2, the piezoresistive element 202 may be disposed within the structural layer 112 of the sensing material stack 210. The structural layer 112 may comprise an insulator to electrically insulate the piezoresistive element 202 from the electrodes 114, 118. In some embodiments, the piezoresistive element 202 can be placed on either side of the piezoelectric layer 116. The piezoresistive element 202 can be coupled, bonded, or otherwise mechanically connected to the sensing material stack 210 in order to be loaded with the piezoelectric layer 116. While a single piezoresistive element 202 is illustrated in FIG. 2, two or more piezoresistive elements can be used with the sensor 200. When a plurality of piezoresistive elements are present, the design, construction, and materials used to form each piezoresistive element can be the same or different.

In some embodiments, the sensors described with respect to FIG. 1 or FIG. 2 can be formed using integrated circuit manufacturing techniques. For example, the sensor may be formed by selectively etching the support structure 102 to form the channel 104 using lithographic, deposition, masking, and etching processes. In some embodiments, a plurality of sensors can be formed in a single manufacturing process due to the relatively small size of the sensors. The sensing material stack can then be formed on the support structure 102 over the channel 104. For example, the structural layer 112 can comprise a film that is placed over the support structure 102 having the channel formed therethrough. Alternatively, the structural layer 112 can be formed directly on the support structure using various deposition techniques. The layers of the sensing material stack can then be formed on the structural layer 112 using various deposition, masking, and etching processes. In some embodiments, the channel can be formed after forming the sensing material stack 110. External leads can then be coupled to the corresponding connections such as by a solder or a wire bond to couple the sensor to the external circuitry, such as the processing circuit 130 or other circuit, which can be used to detect the mechanical deflection or deformation stimulus of the piezoelectric layer. The external circuitry can also be connected to the piezoresistive element 202 to determine the strain on the sensor in use. The filler material 120 can then be disposed over one or more surfaces of the sensor. When a plurality of sensors is formed in a common process, the sensors can be separated prior to being coupled to a surface.

The resulting sensor 100 of FIG. 1 and/or the sensor 200 of FIG. 1 can have a variety of shapes. When viewed from a side opposite the structural support 102, the sensor may have a square or rectangular shape. This may result from the production of a plurality of sensors using an integrated circuit production process with successive and repetitive deposition, patterning, and etching steps. In some embodiments, the sensor may have a round, oval, or polygonal shape. The use of a polygonal shape may allow for the sensor to approximate a rounded shape. In general, the resulting layers including the structural layer 112, the first electrode layer 114, the piezoelectric layer 116, the second electrode layer 118, and/or the piezoresistive element 202 may generally comprise a uniform thickness across the sensor. Additional functional layers or interconnects may also be fabricated around and/or within the sensing material stack before, during, or after the sensing material stack formation.

In use, the sensor may detect a mechanical stimulus comprising a mechanical force, acoustic wave, and/or strain. Initially, the sensor may receive a mechanical stimulus. The force can be received at the filler material 120 within the channel 104 and/or at the filler material 120 on the side of the sensing material stack opposite the channel 104. In some embodiments, the stimulus can be transmitted to the sensing material stack at least partially through the support structure 102. When the force is received at the filler material 120, the force can be transmitted to the sensing material stack through the filler material.

The sensing material stackcan then deflect in response to the mechanical stimulus. Since the sensing material stack is disposed over the channel 104 and the filler material has a bulk modulus less than the support structure, the sensing material stack can flex in response to the mechanical stimulus. For example, the sensing material stackcan flex in a similar way to a membrane on a drum in response to an impact. The flexure of the sensing material stackcan comprise a vibration or displacement depending on the nature of the mechanical stimulus. The filler material 120 surrounding the sensing material stack may serve to dampen any vibrations to reduce any resonance after the mechanical stimulus has passed. Due to the light weight of the sensing material stack, the sensor may have a high fidelity to the mechanical stimulus. As the sensing material stack flexes, the piezoelectric material may deflect and generate an electrical signal. The signal can then be transmitted through the electrode layers to the external circuitry such as the processing circuit 130 to provide an indication of the mechanical stimulus.

In some embodiments, the piezoresistive element 202 may be present in the sensing material stack. When the mechanical stimulus is received at the sensing material stack, the piezoresistive element 202 may be deflected along with the piezoelectric layer. Since the piezoresistive material and the piezoelectric layer are part of the same sensing material stack, the two layers or elements will generally experience the same deflection at the same time. As the sensing material stack flexes, the piezoresistive element may deflect and exhibit a changed electrical resistance. An applied voltage and/or current applied across the piezoresistive element can then be used to detect the change in the electric resistance and determine a change in the strain on the sensing material stack 110. The use of the piezoelectric layer 114 may allow for a dynamic mechanical stimulus to be detected and the piezoresistive element 202 may allow for a static mechanical force and/or strain on the sensor to be determined.

In some embodiments, the sensor may be used in low-power applications. The use of the piezoelectric layer may be beneficial in these applications as the deflection of the piezoelectric layer generates an electrical signal that can be detected without the need for an external power source. When a piezoresistive element 202 is present, an applied voltage or current is needed to detect a change in the resistance of the piezoresistive material. In order to conserve power, the piezoresistive element may not have a voltage and/or current applied to the element 202 until the piezoelectric layer detects an impact or mechanical force above a threshold. The threshold can be a characterization of the impact such as a threshold voltage or current generated by the piezoelectric material, a threshold impact force, or the like. When the piezoelectric layer generates an electrical signal indicative of a mechanical force above the threshold, the voltage and/or current can be applied to the piezoresistive element 202 to determine the strain on the sensor. A timer or other element can then be used to power down the piezoresistive element 202 after a predetermined amount of time following a mechanical force above the threshold. This mode of operation may conserve power while allowing for the detection of dynamic and static mechanical forces on the sensor.

When a dynamic and/or static force is applied to the sensor 100, the sensing material stack may deflect. Due to the support structure 102 and the filler material 120 disposed within the channel, the filler material 120 may limit the amount of deflection of the sensing material stack and limit or prevent over deflection that could damage one or more elements of sensing material stack. For example, a force applied on the sensing material stack towards the channel 104 may result in the compression of the filler material within the channel 104, which will normally engage an adjacent surface of a device or component. As the filler material 120 within the channel 104 compresses, a resistance force is provided by the compressed filler material 120 that can limit the further deflection of the sensing material stack. In some embodiments, the filler material 120 within the channel 104 can be shear thickening and increase resistance in response to the more rapid compression. By selecting a filler material 120 with the desired rheological properties and bulk modulus and considering the allowable strain on the sensing material stack, the sensor can be protected from excessive loads in use.

Figure 3:
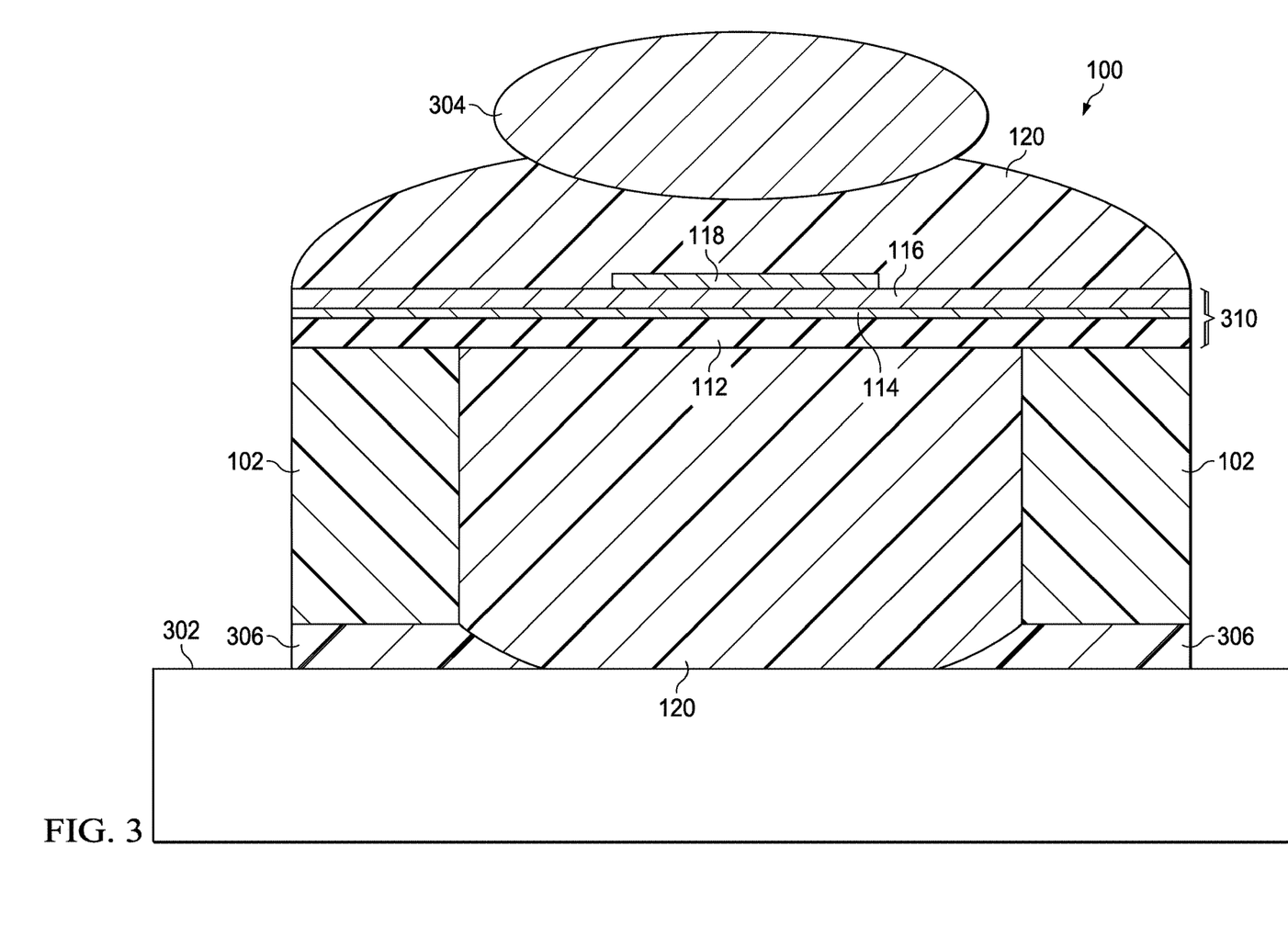
FIG. 3 illustrates a schematic cross-section of a sensor coupled to a substrate and a proof mass according to an embodiment.

The sensors described above can be mechanically coupled to a surface and/or embedded within a device to detect the mechanical forces. The surface and/or the device having the surface may be individually or collectively referred to herein as a substrate. FIG. 3 illustrates a piezoelectric sensor 100 coupled to a surface 302 using a coupling agent to mechanically couple the sensor 100 to the surface. While described with respect to the sensor 100 in FIG. 3, the sensor 200 of FIG. 2 can be coupled to a surface in the same manner. Further, while FIG. 3 illustrates the sensor 100 coupled to a surface 302, the sensor 100 can be embedded within a device below the surface 302 and detect forces in a similar manner.

The coupling agent 306 may comprise any material suitable for mechanically connecting the sensor 100 to the surface 302. In an embodiment, the coupling agent 306 can include an adhesive, a thermoset polymer, a thermoplastic polymer, a resin, an epoxy, or the like. In some embodiments, the coupling agent 306 can include any of the materials described above with respect to the filler material 120. The coupling agent 306 may extend around the perimeter of the sensor 100 or entirely between the sensor 100 and the surface 302. When the coupling agent 306 only extends about the perimeter of the sensor 100, the filler material 120 may be in direct contact with the surface 302. In general, the bulk modulus of the coupling agent 306 may be similar to that of the filler material 120. The coupling agent 306 may have a thickness (e.g., the dimension extending from the surface towards the sensing material stack) that is less than the thickness of the filler material 120 disposed between the surface 302 and the sensing material stack 310, as described in more detail herein. The sensing material stack 310 can be the same or similar to any of the sensing material stacks described herein (e.g., sensing material stack 110, sensing material stack 210, etc.).

The use of the coupling agent 306 having a bulk modulus similar to that of the filler material 120 may allow for some amount of relative motion between the sensor 100 and the surface 302. This embodiment may be useful to detect a stimulus originating in the proof mass 304. For example, the relative movement between the sensor 100 and the surface 302 may at least partially filter out stimuli passing through the substrate 302. The proof mass can generate a signal that would not be filtered out and can be detected by the sensor material stack 310.

When the coupling agent 306 has a bulk modulus much greater than that for the filler 120 or approaching that of the support structure 102, a mechanical force may be supplied by an external source such as through the use of a proof mass 304 or through contact between the filler material 120 and an external surface. In some embodiments, the use of a coupling agent 306 having a higher bulk modulus may be used to detect a stimulus originating in the substrate 302. This embodiment may be useful in detecting mechanical stimuli passing through the substrate 302 as the sensor material stack can deform with the substrate 302, and a proof mass 304 may or may not be present. Thus, the selection of the relative stiffness of the coupling agent 306 can be used to determine the source and type of mechanical forces detected with the sensor 100.

The surface 302 may be a portion of a larger device. The device can include any type of device for which an impact, pressure, or force on the surface can be measured. For example, the sensor may be used with a circuit board to determine when the circuit board is subject to an impact. When a piezoresistive layer is present, the sensor can be used with a touch sensitive surface to determine both when an impact or touch occurs as well as the resulting pressure or strain of the impact or touch. In general, the surface 302 may be relatively stiff as compared to the filler material 120 in order to convey the mechanical stimuli to the sensor 100. In an embodiment, a ratio of the bulk modulus of the surface 302 to the bulk modulus of the filler material 120 may be at least about 1.5, at least about 2, at least about 5, or at least about 10.

In some embodiments, a proof mass 304 may be coupled to the filler material 120 opposite the surface 302 on which the sensor is mounted. The proof mass 304 may be coupled to the protective filler material 120 to generate the deflection and force on the sensing material stack 310 upon acceleration and hence generate the electrical signal from the piezoelectric layer 116 and/or the change in resistance of the piezoresistive element 202. In general, the mass of the proof mass 304 is selected to produce a desired response to a frequency range without overloading the elements of the sensor.

The proof mass 304 can comprise any type of material including those used to form the sensor 100. In an embodiment, the proof mass 304 can have a bulk modulus that is greater than that of the filler material 120. In an embodiment, a ratio of the bulk modulus of the proof mass 304 to the bulk modulus of the filler material 120 may be at least about 10, at least about 100, at least about 500, or at least about 1,000. The proof mass 304 can comprise any shape including spherical, oblong, rectilinear, and the like. As shown in FIG. 3, the proof mass 304 may have a rounded, oval, or elliptical cross section. In this embodiment, a greater portion of the mass of the proof mass 304 may be located at or near the center line of the sensor material stack 310, which may produce a greater deflection in the sensor material stack 310 than a uniform mass that is partly in line with or over the support structure 102. When the proof mass 304 comprises a uniform distribution of the mass, the proof mass 304 may have a length or diameter equal to or less than the inner diameter of the cavity 104 to limit the interaction of the proof mass 304 with the support structure 102, which may limit the amount of deflection of the sensor material stack 310.

Figure 4:
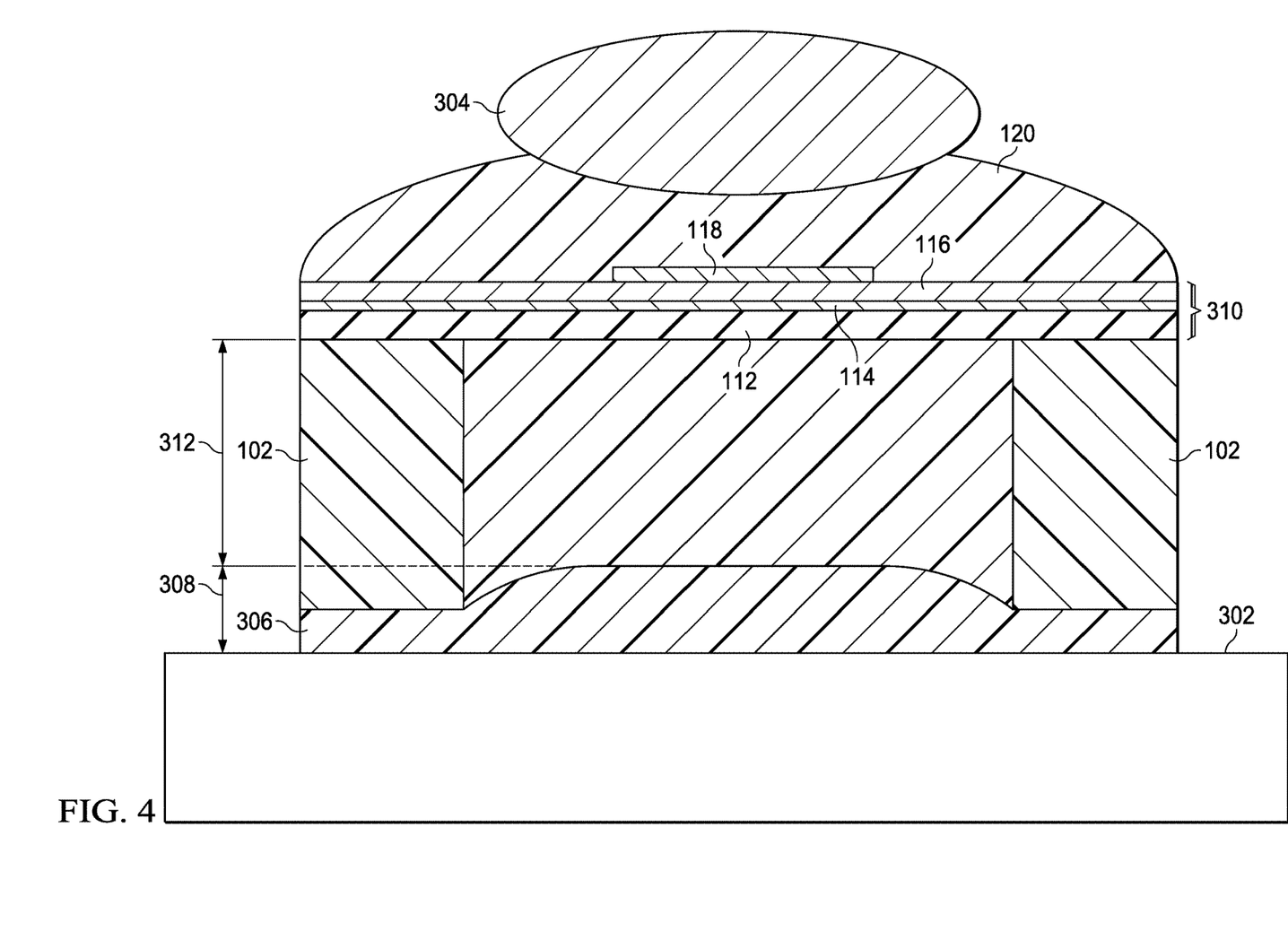
FIG. 4 illustrates another schematic cross-section of a sensor coupled to a substrate and a proof mass according to an embodiment.

Another embodiment of the sensor 100 on the surface 302 is schematically illustrated in FIG. 4. The embodiment illustrated in FIG. 4 is similar to the embodiment described with respect to FIG. 3, and similar components are not be described in the interest of brevity. The main difference between the embodiment illustrated in FIG. 4 and the embodiment illustrated in FIG. 3 is the use of a coupling agent 306 extending entirely between the sensor 100 and the surface 302. In this embodiment, the filler material 120 is not in direct contact with the surface 302, but rather has the coupling agent 306 disposed between the surface 302 and the filler material 120. The coupling agent 306 can include any of those materials described with respect to the coupling agent in FIG. 3.

The shape of the filler material 120 within the channel 104 can vary depending on the manufacturing techniques used to produce the sensor 100. In some embodiments, the relative stiffness, for example as characterized by the bulk modulus, of the filler material 120 and the coupling agent 306 can be approximately matched. In this embodiment, the shape or structure of the filler material 120 in the sensor 100 may not be important. In use, the filler material 120 and the coupling agent 306 can act as a single coupling member to transmit the mechanical forces between the surface 302 and the sensor 100.

In some embodiments, the filler material 120 and the coupling agent 306 may not have the same stiffness. In these embodiments, the transmission of the mechanical forces between the surface and the sensor 100 may be affected by the coupling agent 306. The relative dimensions of the coupling agent 306 and the filler material 120 between the sensing material stack 310 and the coupling agent 306 may affect the relative contributions to the mechanical transmission from the surface to the sensor 100. In an embodiment, the coupling agent 306 may have a thickness 308 that is less than the thickness 312 of the filler material 120. In some embodiments, the ratio of the thickness 312 of the filler material 120 to the thickness of the coupling agent 306 may be greater than about 1, greater than about 2, greater than about 4, or greater than about 9. When the coupling agent 306 is relatively thin, any contribution of the coupling agent 306 to the sensor may be relatively small, and in some embodiments, may be negligible. A thin and stiff coupling agent 306 (e.g., having a bulk modulus approximately the same as or greater than the substrate 302 and/or the structural support 102) may effectively replicate the strain present in the substrate 302 onto the sensor 300.

In use, the sensor system described with respect to FIGS. 3 and 4 may be used to detect a stimulus comprising a dynamic mechanical force, wave, and/or strain associated with the surface 302. Initially, a mechanical stimulus may be present at the surface 302. The mechanical stimulus may include a wave traveling through the surface in any direction and may include a steady state stimulus and/or an impact stimulus. The stimulus can travel through the surface or substrate 302 to the sensor 100. The mechanical stimulus can be received at the coupling agent 306 and/or the filler material 120 disposed between the sensing material stack 310 and the surface or proof mass 304. For example, both sides of the sensor may receive mechanical signals or stimuli. When the coupling agent 306 extends between the filler material 120 and the surface 302, the stimulus can be received at the coupling agent 306 prior to passing to the filler material 120. The mechanical stimulus can then be transmitted through the filler material 120 to the sensing material stack 310. In some embodiments, the stimulus can be transmitted to the sensing material stack 310 at least partially through the support structure 102.

When a proof mass 304 is present, the proof mass 304 can be coupled to the sensing material stack 310 through the filler material 120. When the sensor is accelerated by the stimulus, the inertia of the proof mass may cause the proof mass 304 to resist movement, thereby asserting a force on the sensor. This mechanical force may be applied to the filler material 120 between the proof mass 304 and the sensing material stack 310, and the force can then be applied through the filler material 120 to the sensing material stack 310. The force applied from the surface to the sensing material stack and the force applied from the proof mass 304 to the sensing material stack 310 are coupled through the sensor and combine to produce a deflection of the sensing material stack 310 in the sensor 100.

The sensing material stack 310 can then deflect in response to the mechanical stimulus as described with respect to the use of the sensor above. As described above, the optional piezoresistive element 202 may be present within the sensing material stack 310 and may allow for the measurement of a static strain on the sensor to be measured. Any of the other modes of operation of the sensor described herein can also be used with the sensor coupled to the surface 302 and/or used with a proof mass 304.

Figure 5A:
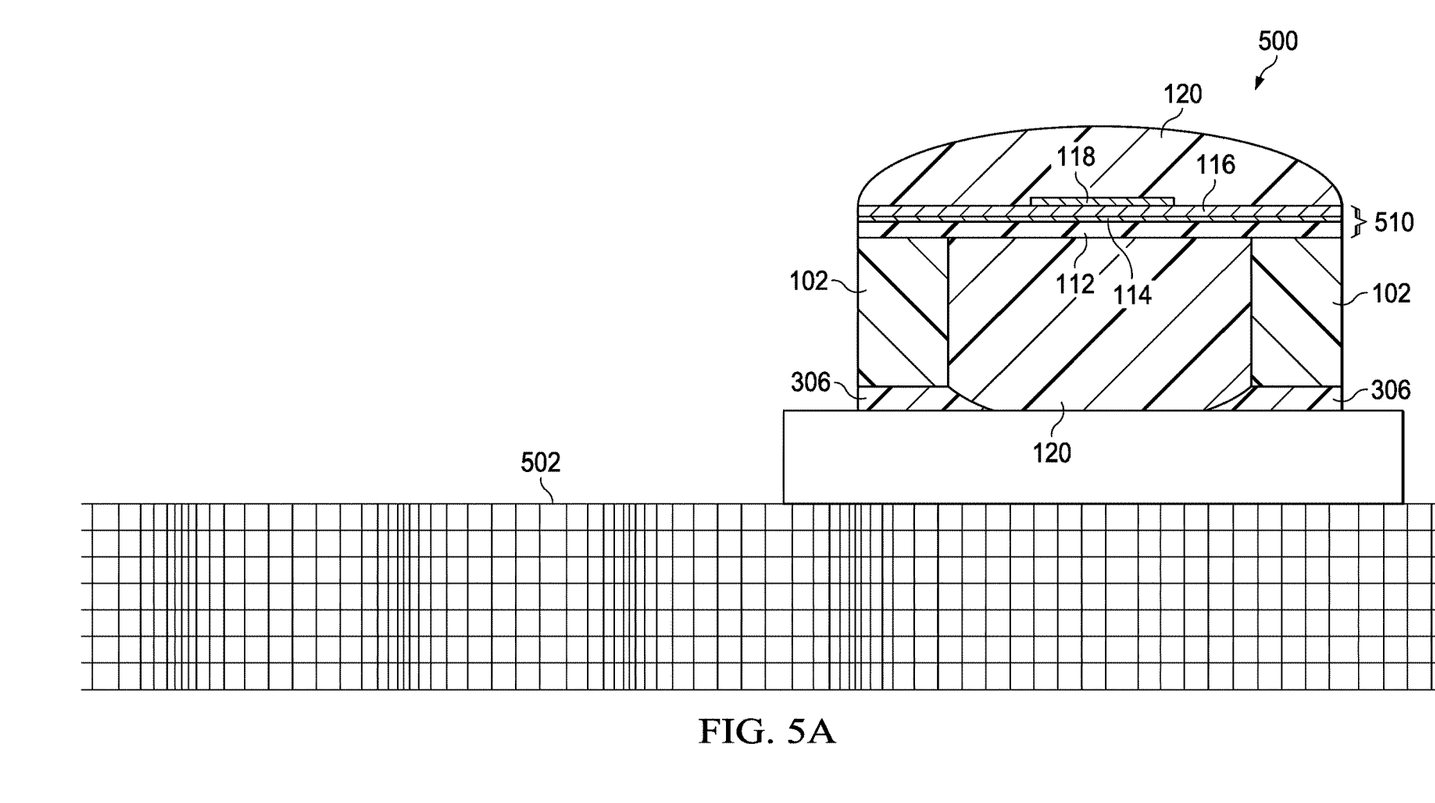
FIG. 5A illustrates a schematic cross-section of a sensor coupled to a substrate according to an embodiment.
Figure 5B:
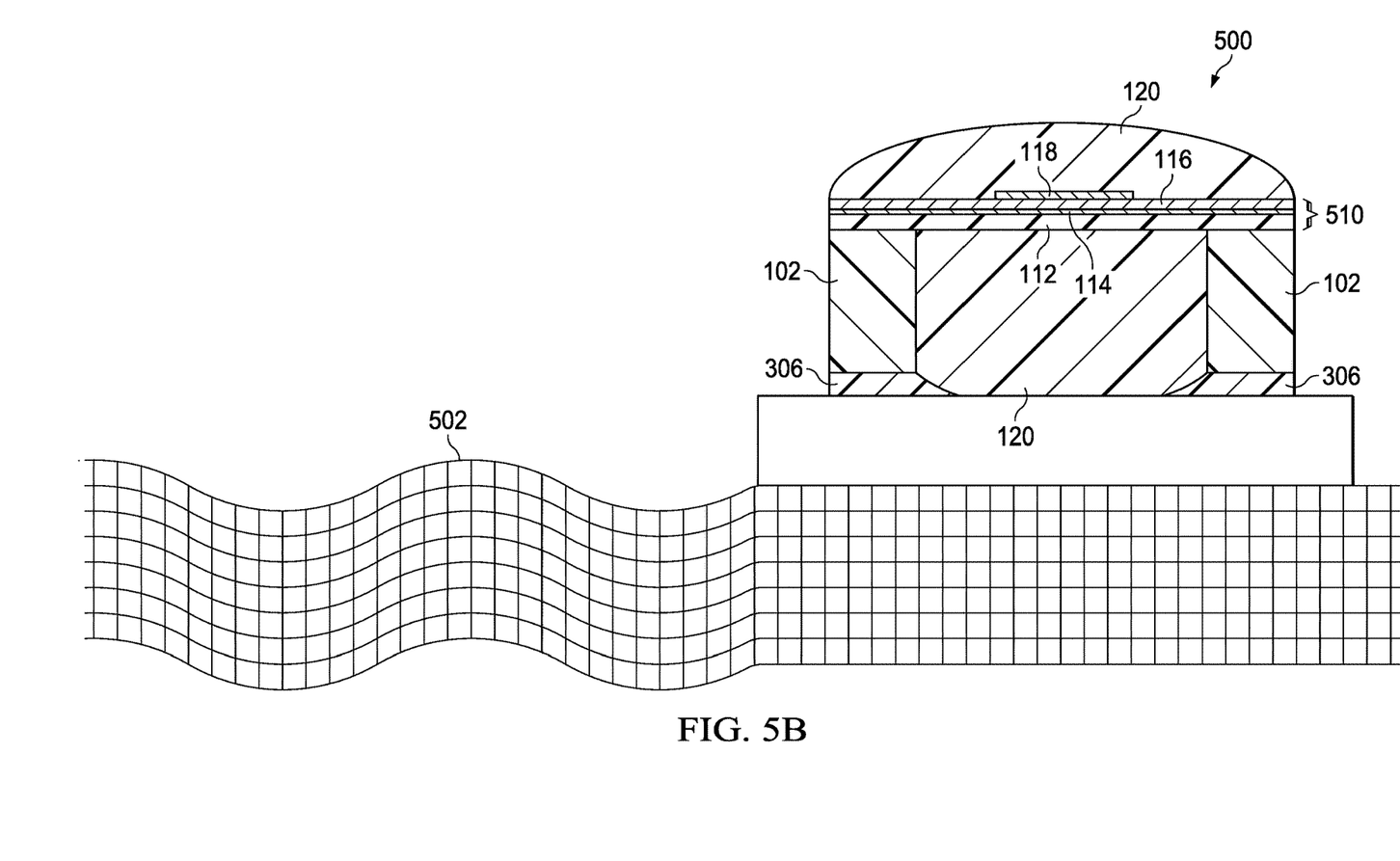
FIG. 5B illustrates another schematic cross-section of a sensor coupled to a substrate according to an embodiment.

The sensor can also be used to detect mechanical stimulus such as shear waves and/or compression waves traveling through the surface in any direction by coupling the sensor to a surface of a component as schematically illustrated in FIGS. 5A and 5B. In this embodiment, the sensor 500 is coupled to the surface 502 of a structure. The sensor 500 can be the same or similar to any of the sensors described herein (e.g., the sensor 100 described with respect to FIG. 1, the sensor 200 described with respect to FIG. 2, etc.). The structure of the sensor 500 as described herein allows for the piezoelectric layer to be relatively thin with a low mass. This may allow the sensor 500 to detect a mechanical stimulus without the need for a proof mass. Rather, the mechanical stimulus may be capable of deflecting the sensing material stack 510 in order to generate the electrical signal for use with the external circuitry.

As shown in FIG. 5A, a compression wave comprises compression zones with tensile zones in between. The compression waves travel through a material at or near the speed of sound in the material and in the direction of the propagation of the wave. Similarly, FIG. 5B illustrates a shear wave. The shear wave comprises portions having a force or movement in a first direction orthogonal to the direction of propagation and having other portions having a force or movement in a second, and opposite, direction orthogonal to the direction of propagation. Both of these waves may be present in the same material and combine and/or cancel to form an overall wave form.

The sensor 500 may be used to detect these types of mechanical waves by being coupled to the surface 502 of the component. As the waves travel along and/or through the surface 502, the waves can be received at the filler material 120 within the channel 104 and/or at the filler material 120 on the side of the sensing material stack 510 opposite the channel 104. In some embodiments, the waves can be transmitted to the sensing material stack 510 at least partially through the support structure 102. When the force is received at the filler material 120, the force can be transmitted to the sensing material stack through the filler material 120.

Due to the low mass of the sensing material stack 510, the sensing material stack 510 can deflect in response to the mechanical waves. Both compression and shear waves can deflect the piezoelectric material in the piezoelectric layer within the sensing material stack 510. As the sensing material stack 510 deflects, the piezoelectric material may generate an electrical signal. The electrical signal can then be transmitted to the external circuitry such as a processing circuit to provide an indication of the mechanical waves. In some embodiments, the sensor may be capable of detecting an impact, the presence of the waves, and/or one or more characteristics of the waves (e.g., frequency, amplitude, etc.).

When the mechanical waves on a surface are being measured, the sensor 500 may not need a piezoresistive element. Rather, the mechanical waves are generally a dynamic phenomena, which can be detected with the piezoelectric material. In this embodiment, the sensor 500 may be a low-power sensor by not requiring a constant voltage and/or current to be applied across the sensor.

In some embodiments, the sensor 500 can be used to detect a contact between the surface 502 and another object. For example, the sensor 500 can be used to indicate an impact of the surface 502 with another external surface as characterized by an impact force transmitted through the surface 502 and/or an impact detected based on another object contacting the filler material 120 of the sensor 500. In this embodiment, the mechanical stimulus may originate from the contact of an external object with the sensor 500 and/or the surface 502. When the external object contacts the surface 502, an impact wave may be generated that can travel through the surface 502 to the sensor 500 as a compression and/or shear wave as described herein. When the external object contacts the sensor directly, the mechanical force can be applied to the filler material 120 and then transferred through the filler material 120 to the sensing material stack 510. The sensing material stack 510 can then deflect in response to the mechanical stimulus as described with respect to the use of the sensor above. The resulting electrical signal can then be used to determine that an impact or contact has occurred.

In addition to using the sensor to determine when a contact occurs, the sensor can also be used as a pressure sensor to determine a contact pressure with an object. In this embodiment, the piezoresistive element may be present within the sensing material stack 510. When the sensor contacts an external object, the contact force can be transmitted through the filler material 120 to the sensing material stack 510, and the piezoresistive element 202 may be deflected along with the piezoelectric layer. Since the piezoresistive element and the piezoelectric layer are part of the same sensing material stack 510, the two layers or elements will generally experience the same deflection at the same time. As the sensing material stack 510 flexes, the piezoresistive element may deflect and exhibit a changed electrical resistance. An applied voltage and/or current applied across the piezoresistive element can then be used to detect the change in the electric resistance and determine a change in the strain on the sensing material stack 510. The resulting strain measurement can be converted into a measure of the pressure being applied at the contact point.

The contact sensor may be used in low-power applications as described above. In some embodiments, the contact sensor may be used in the automated handling of pressure sensitive objects. For example, in the field of robotics, a clamp or robotic hand can be used to engage a component and move the component from one location to another. When the object is pressure sensitive, the robotic clamp may damage the object during handling. Attempts to address this issue have involved using various types of pressure measurements. However these measurements can result in a relatively slow movement of the clamp until contact with the component occurs. The use of the present sensor may allow for operation of the clamp in a velocity or position feedback control mode until contact is detected followed by operation in a torque or force feedback control mode using the pressure measurements.

As noted above, the sensor can be operated on the surface of a device such as a clamp or robotic hand to detect an impact or contact with an external object. The clamp can operate in a velocity feedback control mode to quickly close into contact with the object, which is faster than using a torque feedback control mode in which the motion is slowed and controlled by a pressure sensor. Upon contacting the external object, the piezoelectric layer may detect the contact and provide an electrical signal to indicate that contact has occurred. In an embodiment, the contact can be indicated by an impact or force being detected above a threshold. In response to the contact, the clamp can switch to a torque feedback control mode in which pressure is used to control the closure of the clamp. Once the contact occurs, a piezoresistive layer within the sensing material stack 510 can be used to detect the force between the surface on which the sensor 500 is mounted and the external object in contact with the sensor. The piezoresistive element can be triggered upon detecting an impact or contact in a low-powered device as described herein, or the piezoresistive element can be continuously powered.

While described in the context of a single sensor on a surface, any of the embodiments described herein can include a plurality of sensors associated with a surface. A plurality of sensors can be used to provide a broader field for detecting mechanical stimuli including impacts, contact, mechanical waves, and the like. Each of the plurality of sensors can include the same design or one or more of the plurality of sensors can have different designs (e.g., different components, different materials, etc.). When a piezoresistive element is present in one or more of the sensors of the plurality of sensors, a pressure field can be detected when used as a contact sensor. For example, a plurality of sensors can be used to detect a contact with another surface and provide a pressure field between the surface and the external object. This type of use may allow for improved handling of pressure sensitive objects.

The use of a plurality of sensors may also provide for a determination of one or more properties of a mechanical stimulus. For example, the direction of travel, an impact location, and the like can be determined by having a plurality of sensors. In an embodiment, the direction of travel of a mechanical stimulus can be determined by detecting the time of detection of the mechanical stimulus at a first sensor as described above and detecting the time of detection of the same mechanical stimulus at a second sensor as described above. The difference in the arrival time of the mechanical stimulus at the two locations can be used along with the positions of the two sensors (and the distance therebetween) to determine the direction and speed of the mechanical stimulus. Similarly, the use of three or more sensors can allow the source of the stimulus to be triangulated based on the arrival time and location information for the sensors. Four or more sensors can also be used to further refine the location and/or travel information for the mechanical stimulus.

In addition to the uses described above, the sensors described herein may be useful in any motion and/or vibration sensing applications. The sensors can also be used as a solid state switch to detect a contact and pressure. The solid state switch may be useful as a mechanical button replacement.

Modifications are possible in the described embodiments, and other embodiments are possible, within the scope of the claims.

What is claimed is:

1. A system comprising:
   a sensor comprising:
      a sensing material stack having first and second sides, the sensing material stack comprising: a piezoelectric layer having first and second sides; a first electrode on the first side of the piezoelectric layer; and a second electrode on the second side of the piezoelectric layer; and
      a filler material including: a first portion on the first side of the sensing material stack; and a second portion on the second side of the sensing material stack;
   a substrate coupled to the sensor through the first portion of the filler material; and
   a proof mass coupled to the sensor through the second portion of the filler material.

2. The system of claim 1, further comprising a coupling agent coupling the substrate to the sensor.

3. The system of claim 1, wherein the sensor comprises a support structure, and the sensing material stack is supported on at least one end by the support structure.

4. The system of claim 1, wherein the sensing material stack comprises a piezoresistive layer.

5. The system of claim 1, wherein the piezoelectric material comprises lead zirconate titanate, lead magnesium niobate-lead zirconate titanate, lead zirconate niobate-lead zirconate titanate, aluminum nitride, zinc oxide, quartz, tourmaline, an Al—Sc—N ternary alloy, or any combination thereof.

6. The system of claim 1, wherein the filler material comprises silicone rubber, natural rubber, a polymer, polyurethane, epoxies, adhesive resins, or any combination thereof.

* * * * *